(12) United States Patent  (10) Patent No.: US 9,141,399 B2
Wang  (45) Date of Patent: Sep. 22, 2015

(54) SYSTEM AND METHOD FOR INPUT TOOL INVOCATION AND PROXY DEVICE

(75) Inventor: Yonghui Wang, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 313 days.

(21) Appl. No.: 13/876,844

(22) PCT Filed: Sep. 29, 2011

(86) PCT No.: PCT/CN2011/080327

§ 371 (c)(1),
(2), (4) Date: May 19, 2013

(87) PCT Pub. No.: WO2012/041239

PCT Pub. Date: Apr. 5, 2012

(65) Prior Publication Data

US 2013/0305026 A1    Nov. 14, 2013

(30) Foreign Application Priority Data

Sep. 30, 2010  (CN) .......................... 2010 1 0504151

(51) Int. Cl.
| | | |
|---|---|---|
| *G06F 9/455* | (2006.01) | |
| *G06F 9/44* | (2006.01) | |
| *G06F 13/10* | (2006.01) | |
| *G06F 3/023* | (2006.01) | |
| *G06F 9/54* | (2006.01) | |

(52) U.S. Cl.
CPC ............ *G06F 9/4406* (2013.01); *G06F 3/0236* (2013.01); *G06F 9/541* (2013.01); *G06F 13/105* (2013.01)

(58) Field of Classification Search
CPC .. G06F 3/04886; G06F 3/0236; G06F 13/105
See application file for complete search history.

(56) References Cited

U.S. PATENT DOCUMENTS

| 6,412,015 B1 * | 6/2002 | Navare et al. ................. 709/250 |
| 6,782,411 B2 * | 8/2004 | Navare et al. ................. 709/203 |
| 2009/0100129 A1 * | 4/2009 | Vigil et al. .................... 709/203 |

FOREIGN PATENT DOCUMENTS

| CN | 101266563 A | 9/2008 |
| CN | 101299195 A | 11/2008 |
| CN | 101370155 A | 2/2009 |
| CN | 101894042 A | 11/2010 |

* cited by examiner

*Primary Examiner* — Albert Wang
(74) *Attorney, Agent, or Firm* — Kilpatrick Townsend & Stockton LLP (57) ABSTRACT

A system and a method for input tool invocation and a proxy device enable an installable operating system to perform input operation by invoking the input tool of a local operating system, such as a soft keyboard of the local operating system, an input method of the local operating system, or a soft keyboard and an input method of the local operating system. Even an operating system not installed with input tools can perform input operation by invoking an input tool of a local operating system, thereby avoiding repeated installations of input tools for different operating systems, and resolving the issue of large resource usage caused by repetitive installations of input tools.

6 Claims, 6 Drawing Sheets

SYSTEM AND METHOD FOR INPUT TOOL INVOCATION AND PROXY DEVICE

This application is a US National Stage of International Application No. PCT/CN2011/080327, filed Sep. 29, 2011, designating the United States, and claiming the benefit of Chinese Patent Application No. 201010504151.2, filed with the Chinese Patent Office on Sep. 30, 2010 and entitled "Input tool invocation method and system and proxy device", both of which are hereby incorporated by reference in their entireties.

FIELD

The present invention relates to the field of communications and particularly to an input tool invocation method and system and a proxy device.

BACKGROUND

Along with constant development of operating systems, the operating systems have become an indispensable software environment for predominant smart terminals, and also integrating of operating systems is increasingly stepping into the field of smart terminal operating systems, that is, a plurality of operating systems may exist concurrently on one smart terminal. For the operating systems integrated in the smart terminal, the respective operating systems themselves are separate, so soft keyboards and input methods have to be installed separately for the respective operating systems, and in order to make an input, the respective soft keyboards and input methods have to be selected and started for the different operating systems to make the input.

The following problems exist when a plurality of operating systems are installed in a smart terminal:

1. If there is no corresponding soft keyboard and input method installed in an operating system, then an input operation can not be performed in the course of running the operating system.

2. In order to ensure availability of each operating system, a soft keyboard and an input method have to be installed for each operating system, thus having a considerable space of the terminal occupied by the repeatedly installed soft keyboards and word bases of the input methods.

SUMMARY

Embodiments of the invention provide an input tool invocation method and system and a proxy device so as to address the problems in the prior art of failing to perform an input operation when there is no corresponding input tool installed in an operating system and of having a considerable system space occupied by repeatedly installed input tools.

An input tool invocation system includes:

an installable operating system configured to initiate an input request;

a proxy module configured to trigger an local operating system upon reception of the input request and judgment of no available input tool in the installable operating system; and the local operating system configured to start its own input tool as triggered by the proxy module.

An input tool invocation method includes:

judging whether there is an available input tool an installable operating system upon reception of an input request of the installable operating system; and instructing a local operating system to start and display its own input tool when it is judged that there is no available input tool iii the installable operating system.

A proxy device includes:

a management unit configured to receive an input request of an installable operating system and to judge whether there is an available input tool in the installable operating system; and a proxy unit configured to trigger a local operating system when there is no available input tool in the installable operating system.

The embodiments of the invention provide an input tool invocation system and method and a proxy device so that an installable operating system can invoke an input tool of a local operating system to perform an input operation. With the solutions according to the invention, even an operating system without any input tool installed therein can perform an input operation by invoking an input tool of the local operating system to thereby avoid the problem of having a considerable system resource occupied by repeatedly installed input tools for different operating systems.

BRIEF DESCRIPTION OF THE DRAWINGS

In order to make the technical solutions in the embodiments of the invention or in the prior art more apparent, the drawings to be used in a description of the embodiments or the prior art will be briefly introduced below, and apparently the drawing to be described below are merely illustrative of some embodiments of the invention, and those ordinarily skilled in the art can derive from these drawings other drawings without any inventive effort.

DETAILED DESCRIPTION OF THE EMBODIMENTS

In view of the numerous problems arising from the impossibility to share an input tool between different operating systems, embodiments of the invention enable an input tool to be shared between a local operating system and an installable operating system. The input tool includes a soft keyboard and/or an input method so that it is not necessary to install a soft keyboard and an input method separately for the installable operating system, but an input is made by invoking a soft keyboard and an input method of the local operating system, thus avoiding the problem of an inconvenient user operation due to switching of the soft keyboard and the input method due to switching between the operating systems and also addressing the problem of having a considerable space of a terminal occupied by the soft keyboards and word bases of the input methods due to repeated installation of the soft keyboards and the input methods, which may have a system resource wasted. The local operating system refers to an operating system built in a terminal device shipped from a factory, and the installable operating system refers to an operating system that can be subsequently selected and installed by a user onto the terminal.

Technical solutions of the invention be described below in details with reference to the drawings and respective embodiments.

First Embodiment

Figure 1:
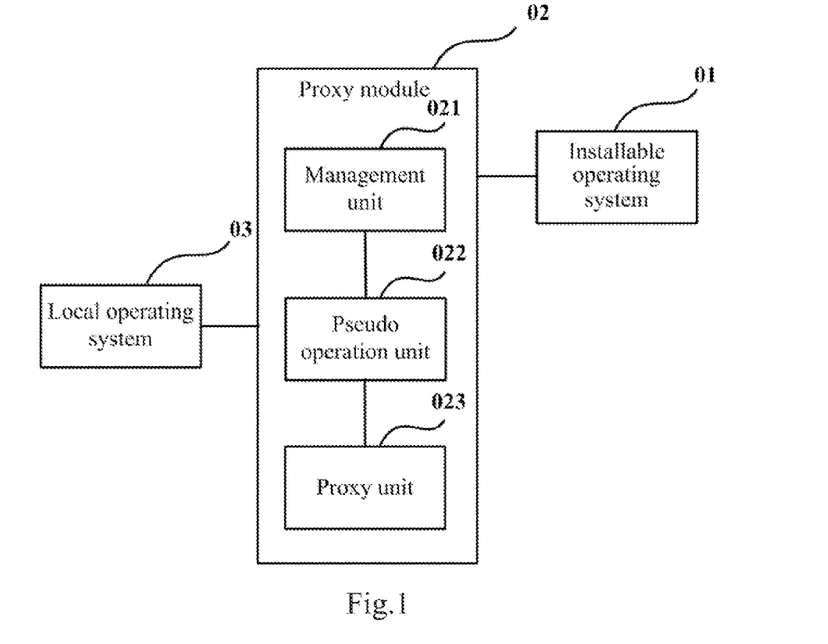
FIG. 1 is a schematic structural diagram of an input tool invocation system according to a first embodiment of the invention.

The first embodiment of the invention provides an input tool invocation system, and FIG. 1 illustrates a schematic structural diagram of the system including an installable operating system 01, a proxy module 02 and a local operating system 03, where:

The installable operating system 01 is configured to initiate an input request; the proxy module 02 is configured to trigger the local operating system upon reception of the input request and judgment of no available input tool in the installable operating system; and the local operating system 03 is configured to start its own input tool as triggered by the proxy module.

The input tool includes a soft keyboard and/or an input method.

The proxy module 02 includes a management unit 021, a pseudo operation unit 022 and a proxy unit 023, where:

The management unit 021 is configured to request for establishing a channel upon reception of the input request and judgment of no available input tool in the installable operating system, where the channel is configured to apply data, input through the input tool of the local operating system, to the installable operating system; the pseudo operation unit 022 is configured to establish the channel upon reception of the request for establishing the channel from the management unit and to request for starting detection of an input event through the input tool of the local operating system; and the proxy unit 023 is configured to perform the detection upon reception of the request for starting the detection from the pseudo operation unit and trigger the local operating system.

The proxy unit 023 is further configured to forward data, input through the input tool of the local operating system, to the pseudo operation unit upon detection of the data.

The pseudo operation unit 022 is further configured to apply the received data o the installable operating system over the established channel.

Second Embodiment

Figure 2:
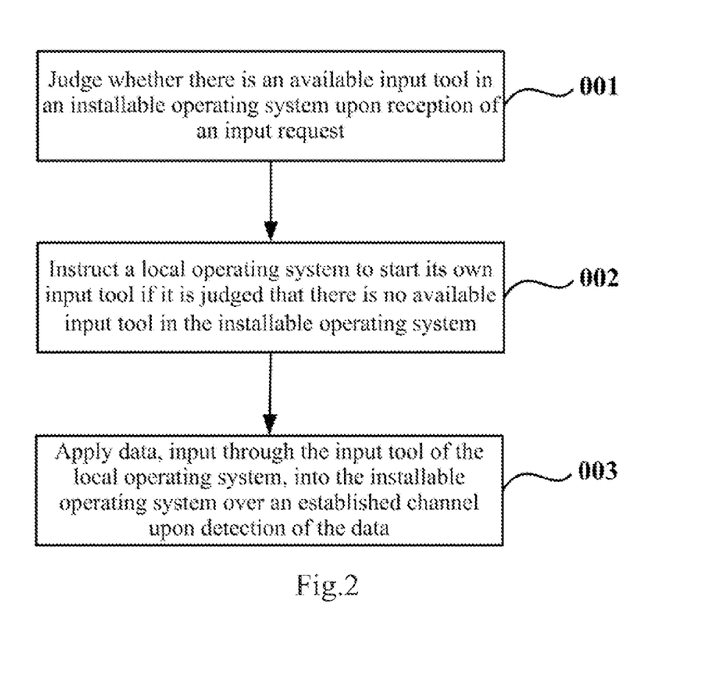
FIG. 2 is a schematic flow chart of an input tool invocation method according to a second embodiment of the invention.

The second embodiment of the invention provides an input tool invocation method, and FIG. 2 illustrates a flow chart of the method particularly including the following steps:

The step 001 is to judge whether there is an available input tool in an installable operating system upon reception of an input request of the installable operating system.

In this step, whether there is an available input tool in the installable operating system can be judged by referring to a list of software installations in the installable operating system or otherwise. For example, if an installation record of soft keyboard and/or input method software is entered in the list of software installations in the installable operating system, then it can be judged that there is an available input tool in the installable operating system; otherwise, it can be judged that there is no available input tool in the installable operating system.

If there is an available input tool in the installable operating system, then the input tool is used, and the invocation process of this second embodiment is terminated. And if there is no available input tool in the installable operating system, the flow proceeds to the step 002. The input tool includes a soft keyboard and/or an input method.

The step 002 is to instruct a local operating system to start its own input tool if it is judged that there is no available input tool in the installable operating system.

When instructing the local operating system to start its own input tool, detection of an input through the input tool of the local operating system is started, and a channel is established, where the channel is configured to apply received data, input through the input tool of the local operating system, to the installable operating system.

The local operating system starts its own input tool in response to the received instruction and returns an input tool start success message, and if the local operating system fails to start its own input tool, then it returns an input tool start failure message and terminates the invocation process of this second embodiment.

The step 003 is to apply data, input through the input tool of the local operating system, into the installable operating system over the established channel upon detection of the data.

The input tool invocation system and method according to the first embodiment and the second embodiment of the invention will be described below in details respectively in a third embodiment and a fourth embodiment taking as an example an input tool which is a soft keyboard.

Third Embodiment

Figure 3:
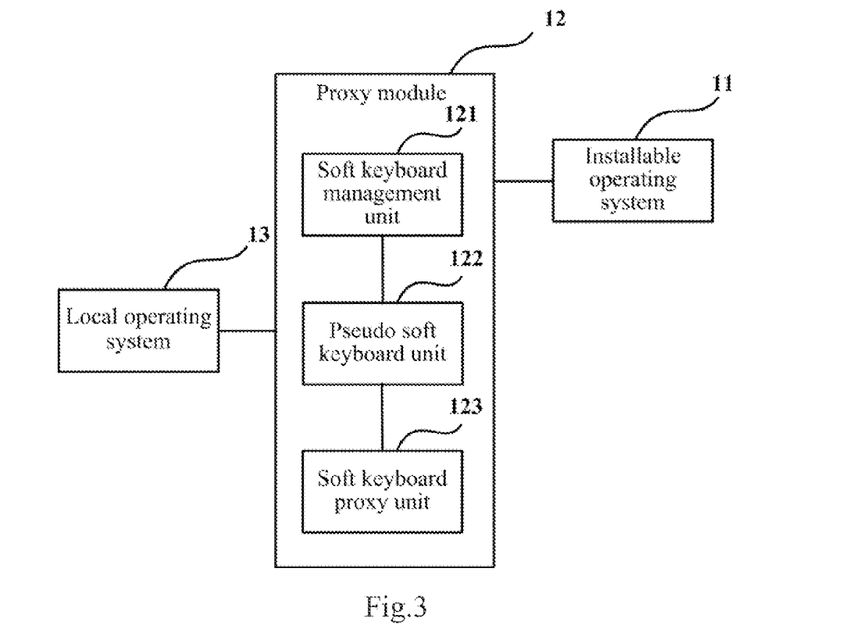
FIG. 3 is a schematic structural diagram of a soft keyboard invocation system according to a third embodiment of the invention.

The third embodiment of the invention provides a soft keyboard invocation system, and as illustrated in FIG. 3, the soft keyboard invocation system includes an installable operating system 11, a proxy module 12 and a local operating system 13, where:

The installable operating system 11 is configured to initiate an input request; the proxy module 12 is configured to trigger the local operating system upon reception of the input request and judgment of no available soft keyboard in the installable operating system; and the local operating system 13 is configured to start and display its own soft keyboard as triggered by the proxy module.

The proxy module 12 includes a soft keyboard management unit 121, a pseudo soft keyboard unit 122 and a soft keyboard proxy unit 123, where:

The soft keyboard management unit 121 is configured to request for establishing a channel upon reception of the input request and judgment of no available soft keyboard in the installable operating system, where the channel is configured to apply data, input through the soft keyboard of the local operating system, to the installable operating system upon reception of the data; the pseudo soft keyboard unit 122 is configured to establish the channel upon reception of the request for establishing the channel from the soft keyboard management unit and to request for starting detection of an input through the soft keyboard of the local operating system; and the soft keyboard proxy unit 123 is configured to perform the detection upon reception of the request for starting the detection from the pseudo soft keyboard unit and trigger the local operating system.

The soft keyboard proxy unit 123 is further configured to forward data, input through the soft keyboard of the local operating system, to the pseudo soft keyboard unit upon detection of the data.

The pseudo soft keyboard unit 122 is further configured to apply the received data to the installable operating system over the established channel.

Fourth Embodiment

Figure 4:
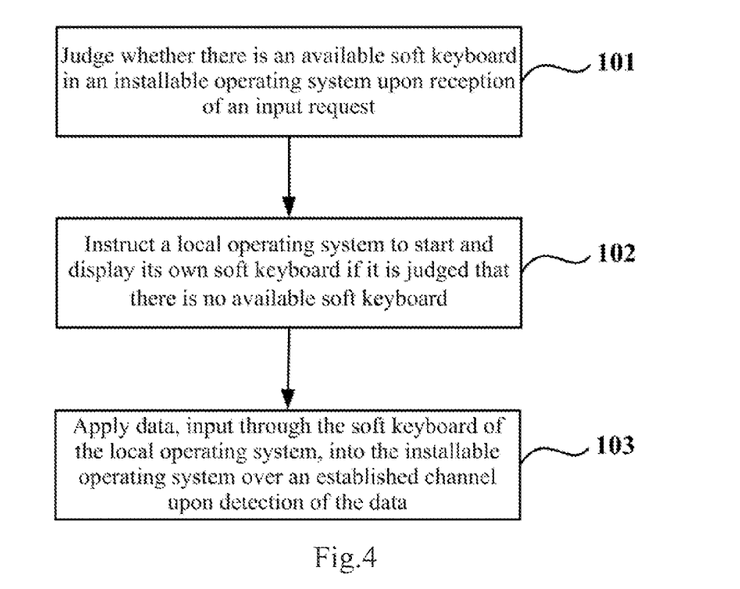
FIG. 4 is a schematic flow chart of a soft keyboard invocation method according to a fourth embodiment of the invention.

The fourth embodiment of the invention provides a soft keyboard invocation method, and FIG. 4 illustrates a flow chart of the method of invoking a soft keyboard of a local operating system in an installable operating system, which particularly includes the following steps:

The step 101 is to judge whether there is an available soft keyboard in an installable operating system upon reception of an input request of the installable operating system.

When a user is performing an input operation in the installable operating system on a terminal, the installable operating system sends the input request to a proxy module, and the proxy module judges whether there is an available soft keyboard in the installable operating system, and if there is an available soft keyboard in the installable operating system, then it invokes the soft keyboard of the installable operating system and terminates the flow of invoking a soft keyboard of a local operating system; otherwise, the flow proceeds to the step 102.

The step 102 is to instruct a local operating system to start and display its own soft keyboard if it is judged that there is no available soft keyboard in the installable operating system.

When it is judged that it is necessary to invoke the soft keyboard of the local operating system for the installable operating system, the proxy module instructs the local operating system to start and display its own soft keyboard on the installable operating system. And in this step, detection of an input through the soft keyboard of the local operating system is started, so that data input through the soft keyboard of the local operating system can be received subsequently, and a channel is established to apply input data to the installable operating system upon reception of the data, so that the data input subsequently into the installable operating system through the soft keyboard of the local operating system can be applied into the installable operating system.

The local operating system starts and displays its own soft keyboard in response to the instruction of the proxy module and returns a soft keyboard display success message to notify the proxy module and the installable operating system that the soft keyboard has been displayed successfully and that a subsequent operation can be performed.

The step 103 is to apply data, input through the soft keyboard of the local operating system, into the installable operating system over the established channel upon detection of the data.

Upon reception of the soft keyboard display success message of the local operating system, an input can be made in the installable operating system through the soft keyboard of the local operating system, and with the detection of an input performed and the channel established in the step 102, data input through the soft keyboard of the local operating system is received, and the received data is applied into the installable operating system.

In the soft keyboard invocation method, an input can be made through the soft keyboard regardless of whether there is an available input method in the installable operating system When there is no available input method in the installable operating system, the installable operating system can receive data input through the soft keyboard of the local operating system in the soft keyboard invocation method according to this embodiment; and when there is an available input method in the installable operating system, the installable operating system can receive data input through the soft keyboard of the local operating system and with the available input method, in the soft keyboard invocation method according to this embodiment.

Figure 5:
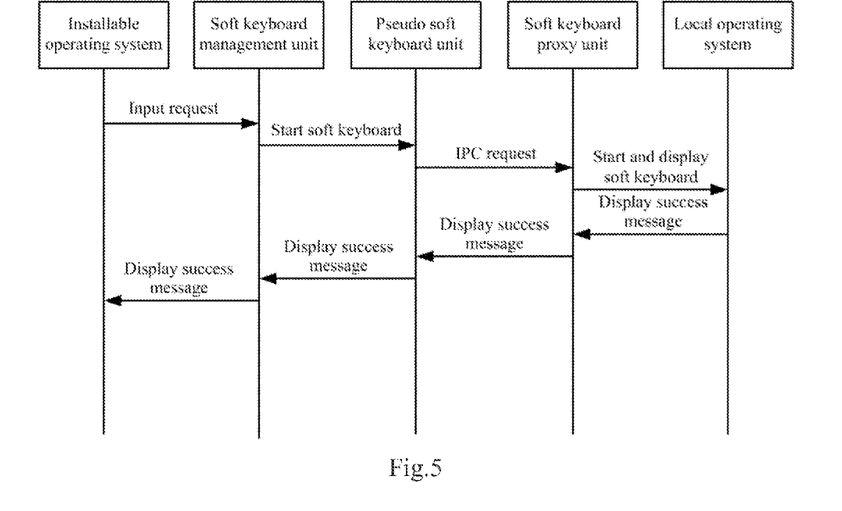
FIG. 5 is a schematic flow chart of communication in a soft keyboard starting process according to the fourth embodiment of the invention.

The step 101 and the step 102 perform a process of starting the soft keyboard of the local operating system, and the step 103 can be regarded as a process of using the soft keyboard of the local operating system. A soft keyboard starting method according to this fourth embodiment will be described below in details in connection with the respective modules and units in the soft keyboard invocation system according to the third embodiment. FIG. 5 illustrates a communication process between the local operating system, the installable operating system and the respective modules and units in the proxy module in the process of starting the soft keyboard of the local operating system, that is, in the step 101 to the step 102, and the communication process particularly includes:

In the first step, the installable operating system initiates an input request to the soft keyboard management unit.

The user runs the installable operating system on the terminal, and to make an input, the installable operating system initiates the input request to the soft keyboard management unit of the proxy module.

In the second step, the soft keyboard management unit requests the pseudo soft keyboard unit to start the soft keyboard of the local operating system.

The soft keyboard management unit judges whether there is an available soft keyboard in the installable operating system upon reception of the input request initiated by the installable operating system, and if there is an available soft keyboard, then it requests for popping up the available soft keyboard; otherwise, it judges that it is necessary to invoke the soft keyboard of the local operating system for the installable operating system, and since the pseudo soft keyboard unit of the proxy module is responsible for firstly integrating the soft keyboard of the local operating system with the soft keyboard of the installable operating system before the soft keyboard of the local operating system is used so that an operation performed subsequently through the soft keyboard of the local operating system can be applied to the installable operating system, the soft keyboard management unit sends the request to start the soft keyboard of the local operating system to the pseudo soft keyboard unit to instruct the pseudo soft keyboard unit to integrate the soft keyboards of the installable operating system and the local operating system.

In the third step, the pseudo soft keyboard unit sends an Internet Process Connection (IPC) request to the soft keyboard proxy unit.

With the integration done, the pseudo soft keyboard unit sends the IPC request to the soft keyboard proxy unit to notify the soft keyboard proxy unit that the installable operating system will invoke the soft keyboard of the local operating system. The soft keyboard proxy unit interfaces the soft keyboard of the local operating system to the soft keyboard of the installable operating system upon reception of the IPC request sent from the pseudo soft keyboard unit so that the installable operating system can subsequently receive an operation performed through the soft keyboard of the local operating system.

In the fourth step, the soft keyboard proxy unit instructs the local operating system to start and display the soft keyboard of the local operating system.

With the interfacing done, the soft keyboard proxy unit instructs the local operating system to start and display the soft keyboard for use by the installable operating system.

In the fifth step, the local operating system starts and displays the soft keyboard and returns a soft keyboard display success message to the soft keyboard proxy unit.

With its own soft keyboard started and displayed, the local operating system returns the soft keyboard display success message to the soft keyboard proxy unit to notify the soft keyboard proxy unit of successful interfacing of the soft keyboard of the local operating system to that of the installable operating system.

In the sixth step, the soft keyboard proxy unit returns the received soft keyboard display success message to the pseudo soft keyboard unit.

This step is for the purpose of notifying the pseudo soft keyboard unit of successful integration of the local operating system with the installable operating system.

In the seventh step, the pseudo soft keyboard unit returns the received soft keyboard display success message to the soft keyboard management unit.

This step is for the purpose of notifying the soft keyboard management unit that the installable operating system can invoke the soft keyboard of the local operating system.

In the eighth step, the soft keyboard management unit returns the received soft keyboard display success message to the installable operating system.

This step is for the purpose of notifying the installable operating system that a simple operation can be performed through the displayed soft keyboard or an input operation can be performed through the soft keyboard of the local operating system and an available input method according to the received soft keyboard display success message.

The input tool invocation system and method according to the first embodiment and the second embodiment of the invention will be described below in details respectively in a fifth embodiment and a sixth embodiment taking as an example an input tool which is an input method.

Fifth Embodiment

Figure 6:
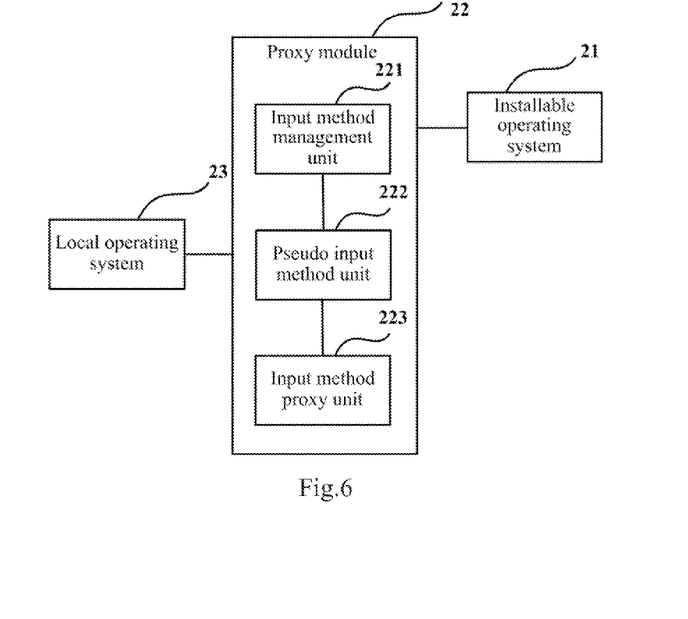
FIG. 6 is a schematic structural diagram of an input method invocation system according to a fifth embodiment of the invention.

The fifth embodiment of the invention provides an input method invocation system, and as illustrated in FIG. 6, the input method invocation system includes an installable operating system 21, a proxy module 22 and a local operating system 23, where:

The installable operating system 21 is configured to initiate an input request; the proxy module 22 is configured to trigger the local operating system upon reception of the input request and judgment of no available input method in the installable operating system; and the local operating system 23 is configured to start its own input method as triggered by the proxy module.

The local operating system 23 is further configured to start the input method after setting operating parameters of the input method as triggered by the proxy module.

The proxy module 22 includes an input method management unit 221, a pseudo input method unit 222 and an input method proxy unit 223, where:

The input method management unit 221 is configured to request for establishing a channel upon reception of the input request and judgment of no available input method in the installable operating system, where the channel is configured to apply data, input through the input method of the local operating system, to the installable operating system upon reception of the data; the pseudo input method unit 222 is configured to establish the channel upon reception of the request for establishing the channel from the input method management unit, to generate a data input interface and to request for starting detection of an input in the interface through the input method of the local operating system; and the input method proxy unit 223 is configured to perform the detection upon reception of the request for starting the detection from the pseudo input method unit and trigger the local operating system.

The input method proxy unit 223 is further configured to forward data, input in the interface through the input method of the local operating system, to the pseudo input method unit upon detection of the data.

The pseudo input method unit 222 is further configured to apply the received data to the installable operating system over the established channel.

Sixth Embodiment

Figure 7:
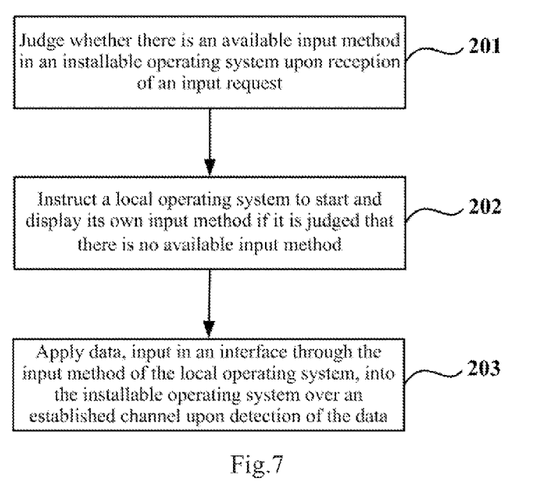
FIG. 7 is a schematic flow chart of an input method invocation method according to a sixth embodiment of the invention.

The sixth embodiment of the invention provides an input method invocation method, and FIG. 7 illustrates a flow chart of the method of invoking an input method of a local operating system in an installable operating system, which particularly includes the following steps:

The step 201 is to judge whether there is an available input method in an installable operating system upon reception of an input request from the installable operating system.

Similarly to the first embodiment, the proxy module firstly judges whether there is an available input method in the installable operating system upon reception of the input request from the installable operating system, and if there is an available input method, then it invokes the input method of the installable operating system and terminates the flow of invoking an input method of a local operating system; otherwise, the flow proceeds to the step 202.

The step 202 is to instruct a local operating system to start its own input method if it is judged that there is no available input method in the installable operating system.

When it is judged that it is necessary to invoke the input method of the local operating system for the installable operating system, the proxy module instructs the local operating system to start its own input method. In the course of starting the input method, the proxy module generates and displays an data input interface in the installable operating system and starts detection of an input in the interface through the input method of the local operating system, so that data input in the interface through the input method of the local operating system can be received subsequently, and a channel is established to apply input data to the installable operating system upon reception of the data, so that the data input subsequently in the interface through the input method of the local operating system can be applied into the installable operating system.

The local operating system sets its own input method upon reception of the instruction to start its own input method, where the setting refers to setting of various operating parameters of the input method, e.g., installation, uninstalling, a switching order, etc., of various input methods, with its own input method set, it starts its own input method and returns an input method start success message to notify the proxy module and the installable operating system that the input method has been started successfully and that a subsequent operation can be performed.

The step 203 is to apply data, input in the interface through the input method of the local operating system, into the installable operating system over the established channel upon detection of the data.

Upon reception of the input method start success message from the local operating system, an input can be made in the pop-up interface in the installable operating system through the input method of the local operating system, and with the detection of an input performed and the channel established in the step 202, data input through the input method of the local operating system is received, and the received data is applied into the installable operating system.

Figure 8:
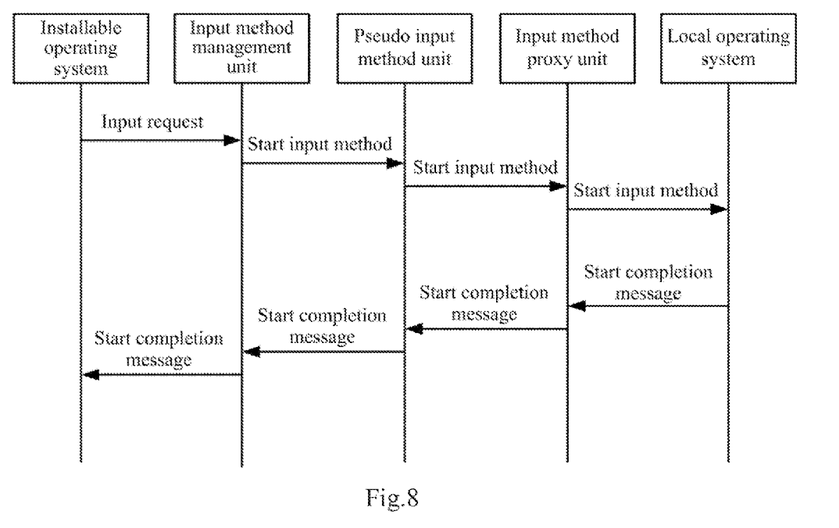
FIG. 8 is a schematic flow chart of communication in an input method starting process according to the sixth embodiment of the invention.

The step 201 and the step 202 perform a process of starting the input method of the local operating system, and the step 203 can be regarded as a process of using the input method of the local operating system. An input method starting method according to this sixth embodiment will be described below in details in connection with the respective modules and units in the input method invocation system according to the fifth embodiment. FIG. 8 illustrates a communication process between the local operating system, the installable operating system and the respective modules and units in the proxy module in the process of starting the input method of the local operating system, that is, in the step 201 to the step 202, and the communication process particularly includes:

In the first step, the installable operating system initiates an input request to the input method management unit.

The user runs the installable operating system on the terminal, and to make an input, the installable operating system initiates the input request to the input method management unit of the proxy module.

In the second step, the input method management unit requests the pseudo input method unit to start the input method of the local operating system.

Integration of the input method of the local operating system with the input method of the installable operating system is performed in the pseudo input method unit of the proxy module, so the input method management unit requests the pseudo input method unit to start the input method of the local operating system upon reception of the input request initiated by the installable operating system and judgment of no an available input method in the installable operating system, and the pseudo input method unit integrates the input method of the local operating system with that of the installable operating system upon reception of the request from the input method management unit, so that contents input through the input method of the local operating system can be subsequently applied to the installable operating system.

In the third step, the pseudo input method unit requests the input method proxy unit to start the input method of the local operating system.

With the integration done, the pseudo input method unit requests the input method proxy unit to start the input method of the local operating system. The input method proxy unit interfaces the input method of the local operating system to the input method of the installable operating system upon reception of the request so that the installable operating system can subsequently receive contents input through the input method of the local operating system.

It shall be noted that the input method proxy unit pops up an operation interface in the installable operating system upon reception of the request, and each subsequent input through the input method of the local operating system is made in this operation interface.

In the fourth step, the input method proxy unit instructs the local operating system to start the input method of the local operating system.

With the interfacing done, the input method proxy unit instructs the local operating system to start the input method for use by the installable operating system.

In the fifth step, the local operating system starts its own input method and returns an input method start completion message to the input method proxy unit.

Before the input method is started, a relevant setting operation of the input method will be made, e.g., setting of installation, uninstalling, a switching order, etc., so with its own input method set, the local operating system starts its own input method and returns the input method start completion message to the input method proxy unit to notify the input method proxy unit of successful interfacing of the input method of the local operating system to that of the installable operating system.

In the sixth step, the input method proxy unit returns the received input method start completion message to the pseudo input method unit.

This step is for the purpose of notifying the pseudo input method unit of successful integration of the input method of the local operating system with that of the installable operating system.

In the seventh step, the pseudo input method unit returns the received input method start completion message to the input method management unit.

This step is for the purpose of notifying the input method management unit that the input method of the local operating system has been started successfully and that the installable operating system can invoke the input method of the local operating system.

In the eighth step, the input method management unit returns the received input method start completion message to the installable operating system.

This step is for the purpose of notifying the installable operating system that an input can be made through the input method of the local operating system. After the input method start completion message is sent to the installable operating system, the pop-up interface can be used in the installable operating system to perform an input operation in the interface.

The input tool invocation system and method according to the first embodiment and the second method of the invention will be described below in details respectively in a seventh embodiment and an eighth embodiment taking as an example an input tool which is a soft keyboard and an input method.

The soft keyboard invocation system and the input method invocation system according to the third embodiment and the fifth embodiment of the invention can separately enable a soft keyboard to be shared and an input method to be shared respectively between an installable operating system and a local operating system, and the systems according to the third embodiment and the fifth embodiment of the invention can also be integrated into one system so that both a soft keyboard of a local operating system and an input method of the local operating system can be invoked in an installable operating system, and a system for enabling a soft keyboard and an input method to be shared between a local operating system and an installable operating system according to a seventh embodiment will be described below in details.

Seventh Embodiment

Figure 9:
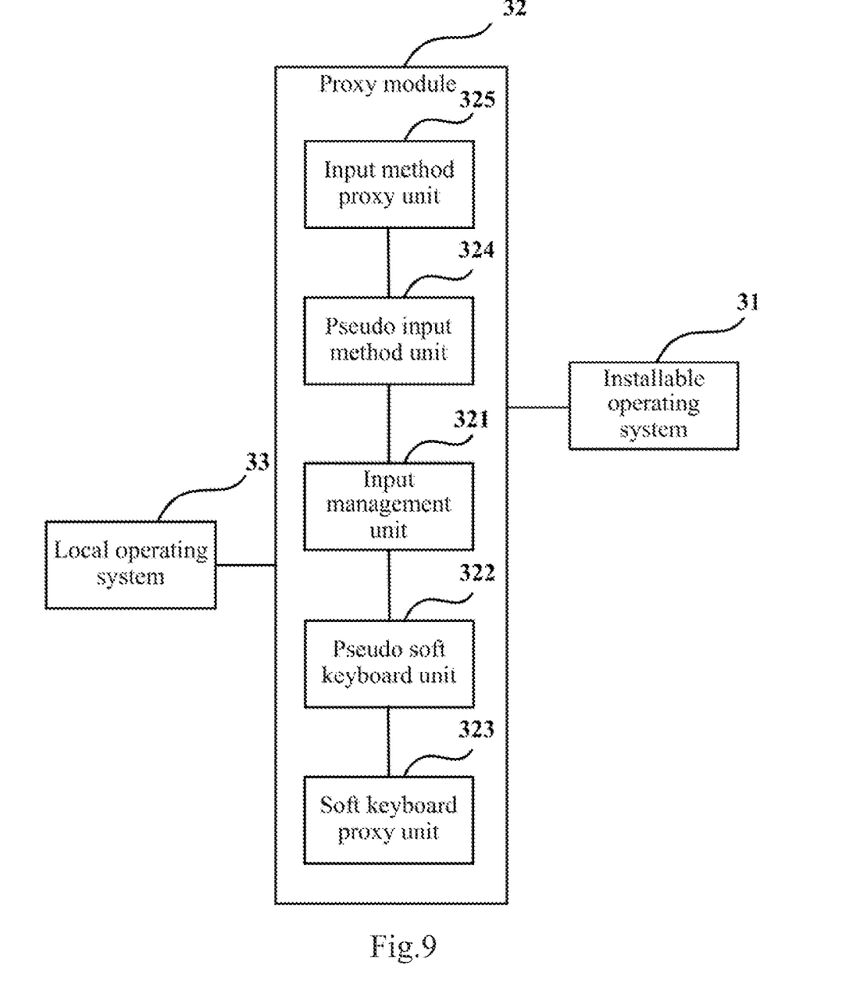
FIG. 9 is a schematic structural diagram of a data input system according to a seventh embodiment of the invention.

As illustrated in FIG. 9, the seventh embodiment of the invention provides a soft keyboard and input method invocation system including an installable operating system 31, a proxy module 32 and a local operating system 33, where:

The installable operating system 31 is configured to initiate an input request; the proxy module 32 is configured to trigger the local operating system upon reception of the input request and judgment of neither available soft keyboard nor available input method in the installable operating system; and the local operating system 33 is configured to start and display its own soft keyboard and start its own input method as triggered by the proxy module.

The local operating system 33 is further configured to start and display its own soft keyboard as triggered by the proxy module and to start the input method after setting operating parameters of the input method as triggered by the proxy module.

The proxy module 32 includes an input management unit 321, a pseudo soft keyboard unit 322, a soft keyboard proxy unit 323, a pseudo input method unit 324 and an input method proxy unit 325, where:

The input management unit 321 is configured to request for establishing channels upon reception of the input request and judgment of neither available soft keyboard nor available input method in the installable operating system, where the channels are configured to apply data, input through the soft keyboard and the input method of the local operating system, to the installable operating system upon reception of the data; the pseudo soft keyboard unit 322 is configured to establish a first channel upon reception of the request for establishing channels from the input management unit, and to request for starting detection of an input through the soft keyboard and the input method of the local operating system; the soft keyboard proxy unit 323 is configured to perform the detection upon reception of the request for starting the detection from the pseudo soft keyboard unit and trigger the local operating system; the pseudo input method unit 324 is configured to establish a second channel upon reception of the request for establishing channels from the input management unit, to generate a data input interface and to request for starting detection of an input in the interface through the input method and the soft keyboard of the local operating system; and the input method proxy unit 325 is configured to perform the detection upon reception of the request for starting the detection from the pseudo input method unit and trigger the local operating system.

The input method proxy unit 323 is further configured to forward data, input through the soft keyboard and the input method of the local operating system, to the pseudo soft keyboard unit upon detection of the data.

The pseudo soft keyboard unit 322 is further configured to apply the received data to the installable operating system over the established first channel.

The input method proxy unit 325 is further configured to forward data, input in the interface through the input method and the soft keyboard of the local operating system, to the pseudo input method unit upon detection of the data.

The pseudo input method unit 324 is further configured to apply the received data to the installable operating system over the established second channel.

The input management unit in this seventh embodiment can be regarded as the integration of the soft keyboard management unit in the third embodiment with the input method management unit in the fifth embodiment, and this input management unit can perform the functions of both the soft keyboard management unit and the input method management unit.

The other units than the input management unit in the proxy module in this seventh embodiment can be regarded as units with the same functions as the corresponding units in the third embodiment and the fifth embodiment, and alike the units in the third embodiment and the fifth embodiment corresponding to the relevant units in the seventh embodiment can also perform the functions of the relevant units in the seventh embodiment.

Eighth Embodiment

Figure 10:
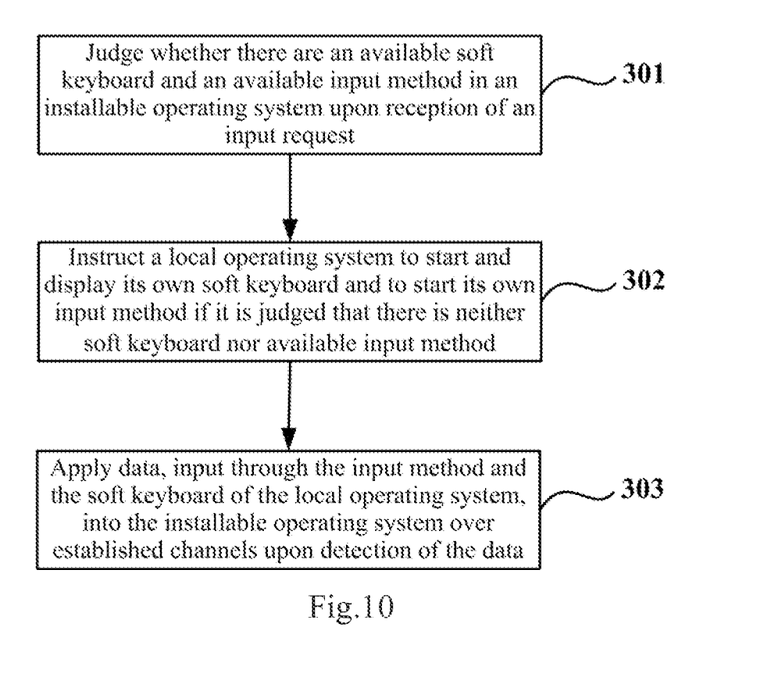
FIG. 10 is a schematic flow chart of a data input method according to an eighth embodiment of the invention.

The eighth embodiment of the invention provides a soft keyboard and input method invocation method, and FIG. 10 illustrates a flow of a data input method according to this embodiment, which particularly includes:

The step 301 is to judge whether there are an available soft keyboard and an available input method in an installable operating system upon reception of an input request from the installable operating system.

When a user is performing an input operation on a terminal, the installable operating system sends the input request to a proxy module, and the proxy module judges whether there are an available soft keyboard and input method in the installable operating system, and if there are an available soft keyboard and input method, then it invokes the soft keyboard and the input method of the installable operating system and terminates the flow of invoking a soft keyboard and an input method of a local operating system; otherwise, the flow proceeds to the step 302.

The step 302 is to instruct a local operating system to start and display its own soft keyboard and to start its own input method if it is judged that there is neither available soft keyboard nor available input method in the installable operating system.

When it is judged that it is necessary to invoke the soft keyboard and the input method of the local operating system for the installable operating system, the proxy module instructs respectively the local operating system to start and display its own soft keyboard on the installable operating system and the local operating system to start its own input method.

In the course of instructing the local operating system to start and display its own soft keyboard, the proxy module starts detection of an input through the soft keyboard of the local operating system; and in the course of instructing the local operating system to start its own input method, the proxy module generates and displays an data input interface in the installable operating system and starts detection of an input in the interface through the input method of the local operating system.

In the meanwhile of instructing the local operating system to start and display its own soft keyboard and to start the input method, the proxy module establishes channels configured to apply input data to the installable operating system upon detection of the data, where the channels include the following two channels:

The first channel is established to apply an input through the soft keyboard and the input method of the local operating system to the installable operating system upon detection of the data through the soft keyboard; and the second channel is established to apply an input the interface through the input method and the soft keyboard of the local operating system to the installable operating system upon detection of the data through the input method.

The local operating system starts and displays its own soft keyboard and starts its own input method and returns a soft keyboard display success message and an input method start success message to notify the proxy module and the installable operating system that an input operation can be performed.

The step 303 is to apply data, input through the input method and the soft keyboard of the local operating system, into the installable operating system over the established channels upon detection of the data.

The proxy module can apply an input through the soft keyboard and the input method of the local operating system to the installable operating system over the established first channel upon detection of the data through the soft keyboard and can also apply an input in the interface through the input method and the soft keyboard of the local operating system to the installable operating system over the established second channel upon detection of the data through the input method, that is, the proxy module can select either of the detection methods and the corresponding channel to apply the detected input data to the installable operating system.

The step 301 and the step 302 perform a process of starting the soft keyboard and the input method of the local operating system, and the step 303 can be regarded as a process of using the soft keyboard and the input method of the local operating system. The input management unit in the seventh embodiment can be equivalent respectively to the soft keyboard management unit in the third embodiment and the input method management unit in the fifth embodiment, and the other units than the input management unit in the proxy module can also be regarded as units with the same functions as the corresponding units in the third embodiment and the fifth embodiment, so the respective modules and units in the seventh embodiment of the invention perform the method of starting a soft keyboard and an input method of a local operating system according to the eighth embodiment of the invention in the same communication process between the respective modules and units as the communication processes between the respective modules and units according to the fourth embodiment and the sixth embodiment, and a repeated description will be omitted here.

The first channel and the second channel iii the seventh embodiment and the eighth embodiment may not necessarily be established concurrently, that is, the proxy module can establish only the first channel while instructing the local operating system to start and display its own soft keyboard and to start the input method and subsequently apply received data to the installable operating system over the established first channel; or can establish only the second channel while instructing the local operating system to start and display its own soft keyboard and to start the input method and subsequently apply received data to the installable operating system over the established second channel; or establish both the first channel and the second channel while sending the instruction and subsequently select either of the channels to apply received data to the installable operating system.

Ninth Embodiment

Figure 11:
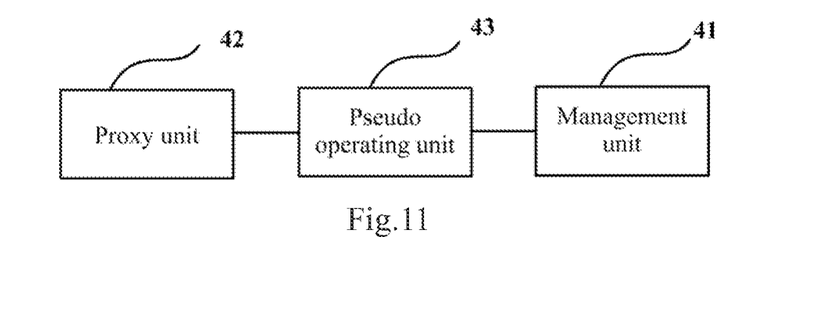
FIG. 11 is a schematic structural diagram of a proxy device according to a ninth embodiment of the invention.

The ninth embodiment of the invention provides a proxy device, and FIG. 11 illustrates a schematic structural diagram of the proxy device including a management unit 41 and a proxy unit 42, where:

The management unit 41 is configured to receive an input request from an installable operating system and to judge whether there is an available input tool in the installable operating system; and the proxy unit 42 is configured to trigger a local operating system when there is no available input tool in the installable operating system.

The input tool includes a soft keyboard and/or an input method.

The management unit 41 is further configured to request for establishing a channel upon reception of the input request and judgment of no available input tool in the installable operating system, where the channel is configured to apply data, input through an input tool of the local operating system, to the installable operating system; and The device further includes:

A pseudo operation unit 43 configured to establish the channel upon reception of the request for establishing the channel from the management unit and to request for starting detection of an input event through the input tool of the local operating system; and The proxy unit 42 is further configured to perform the detection upon reception of the request for starting the detection from the pseudo operation unit and trigger the local operating system.

The proxy unit 42 is further configured to forward data, input through the input tool of the local operating system, to the pseudo operation unit upon detection of the data.

The pseudo operation unit 43 is further configured to apply the received data to the installable operating system over the established channel.

The proxy device according to this embodiment can be regarded as a device with the same function as the proxy modules in the first, third, fifth and seventh embodiments, and also the proxy modules in the first, third, fifth and seventh embodiments can perform the function of the proxy device according to this embodiment. The proxy device according to this embodiment can be applicable to the input tool invocation systems and methods according to the first embodiment to the eighth embodiment.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. An input tool invocation system, comprising:
   an installable operating system configured to initiate an input request;
   a proxy module configured to trigger an local operating system upon reception of the input request and judgment of no available input tool in the installable operating system; and
   the local operating system configured to start its own input tool as triggered by the proxy module;
   wherein the input tool comprises:
   a soft keyboard; or
   an input method; or
   a soft keyboard and an input method;
   wherein the proxy module comprises:
   a management unit configured to request for establishing a channel upon reception of the input request and judgment of no available input tool in the installable operating system, wherein the channel is configured to apply data, input through the input tool of the local operating system, to the installable operating system;
   a pseudo operation unit configured to establish the channel upon reception of the request for establishing the channel from the management unit and to request for starting detection of an input event through the input tool of the local operating system; and
   a proxy unit configured to perform the detection upon reception of the request for starting the detection from the pseudo operation unit and trigger the local operating system.

2. The system according to claim 1, wherein:
   the proxy unit is further configured to forward data, input through the input tool of the local operating system, to the pseudo operation unit upon detection of the data; and
   the pseudo operation unit is further configured to apply the received data to the installable operating system over the established channel.

3. An input tool invocation method, comprising:
   judging whether there is an available input tool in an installable operating system upon reception of an input request from the installable operating system; and
   instructing a local operating system to start its own input tool when it is judged that there is no available input tool in the installable operating system;
   wherein the input tool comprises:
   a soft keyboard; or
   an input method; or
   a soft keyboard and an input method;

wherein the instructing the local operating system to start its own input tool comprises:

starting detection of an input through the input tool of the local operating system and establishing a channel configured to apply received data, input through the input tool of the local operating system, into the installable operating system; and the local operating system starting its own input tool and returning an input tool start success message.

4. The method according to claim 3, wherein after instructing the local operating system to start its own input tool, the method further comprises:

applying data, input through the input tool of the local operating system, into the installable operating system over the established channel upon detection of the data.

5. A proxy device, comprising:

a management unit configured to receive an input request from an installable operating system and to judge whether there is an available input tool in the installable operating system; and a proxy unit configured to trigger a local operating system when there is no available input tool in the installable operating systems;

wherein the input tool comprises:

a soft keyboard; or an input method; or a soft keyboard and an input method;

wherein:

the management unit is further configured to request for establishing a channel upon reception of the input request and judgment of no available input tool in the installable operating system, wherein the channel is configured to apply data, input through an input tool of the local operating system, into the installable operating system; and the device further includes:

a pseudo operation unit configured to establish the channel upon reception of the request for establishing the channel from the management unit and to request for starting detection of an input event through the input tool of the local operating system; and the proxy unit is further configured to perform the detection upon reception of the request for starting the detection from the pseudo operation unit and trigger the local operating system.

6. The proxy device according to claim 5, wherein:

the proxy unit is further configured to forward data, input through the input tool of the local operating system, to the pseudo operation unit upon detection of the data; and the pseudo operation unit is further configured to apply the received data into the installable operating system over the established channel.

* * * * *